Figure 1:
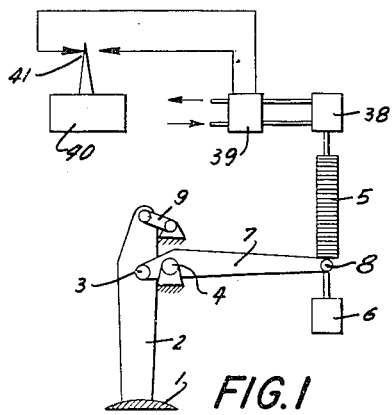

Nov. 20, 1956    H. VON SCHERTEL    2,771,051
AUTOMATIC SEA-DAMPING GEAR FOR
HYDROFOIL BEARING WATERCRAFT

Filed Oct. 7, 1952    2 Sheets-Sheet 1

INVENTOR.
Hans Von Schertel
BY:
Michael S. Striker

Nov. 20, 1956     H. VON SCHERTEL     2,771,051
AUTOMATIC SEA-DAMPING GEAR FOR
HYDROFOIL BEARING WATERCRAFT

Filed Oct. 7, 1952     2 Sheets-Sheet 2

INVENTOR.
Hans Von Schertel
BY:
Michael S. Striker
agt.

United States Patent Office 2,771,051
Patented Nov. 20, 1956

2,771,051

AUTOMATIC SEA-DAMPING GEAR FOR HYDROFOIL BEARING WATERCRAFT

Hanns von Schertel, Wiesbaden, Germany, assignor to Supramar A. G., Zug, Switzerland Application October 7, 1952, Serial No. 313,405

Claims priority, application Switzerland October 23, 1951

20 Claims. (Cl. 114—66.5)

My invention relates to an automatic rough-sea damping device for water craft provided with partially emerging hydrofoils which in passage raise the hull entirely or partially out of the water and with means for varying the hydrodynamic lifting force. My invention aims to render such craft more seaworthy, to decrease their oscillation amplitude and to dampen or check their comparatively hard movements.

In prior proposals for attaining the said goal, there only have been provided spring means conventional to land vehicles which were intended for cushioning the transmission of the shocks originating from the foils onto the hull and the passengers, but which reduced neither the disturbing force itself nor the foil oscillations caused thereby.

The main object of my invention is to use the motive-power fluctuations which arise shock-like on entering and leaving a wave and of which the impulse is too short to overcome the inertia of the craft and to cause substantial changes of position as adjusting or regulating force for the sea-damping device and to employ their intensity and period or cycle as controller for the subsequent regulating process within the wave crest or wave trough.

The automatic sea-damping gear disclosed by my present invention is characterized in that the craft's hydrofoil lifting force-varying means through resilient control elements are so actuated that, at the beginning of a disturbing impulse in a wave, the said means change the foil lifting force in a sense balancing the disturbing force, and in that a delaying element is provided which delays the return into the normal position when the disturbing force decays.

The extent of such delay may be manually or automatically controlled in accordance with the duration of the disturbing cycle, i. e. proportionally to the wave length, and/or of its amplitude, i. e. inversely proportional to the wave height.

The gear described decreases the static stability of the craft. In order to provide sufficient stability, a means may be provided which exerts a holding force on the gear which force has to be overcome by the disturbing force before the said means is shifted.

The control principle may be materialized through foils or parts thereof which are vertically movable in opposition to an elastic control element and in which through guiding elements the hydrofoil, when being raised, is caused to turn so as to decrease the angle of attack and, when being lowered, is caused to turn so as to increase the angle of attack. The foils, when being moved, may be rotated by means of a servomotor which is switched on as soon as such a movement occurs and which rotates the foil, when raised, so as to decrease the angle of attack and vice versa. The servomotor may be thrown in by means of a controlling element which is responsive to changes of pressure and to which the foil portions are connected.

Furthermore, foils may be provided which are pivoted on an axis situated before the center of pressure or which comprise flaps or auxiliary foils pivotable on their trailing edge and which are connected to a resilient control element which counteracts the moment about the said axis.

Figure 2:
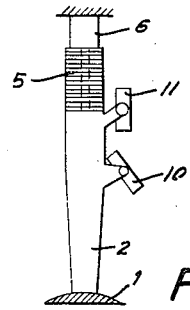
Figure 3:
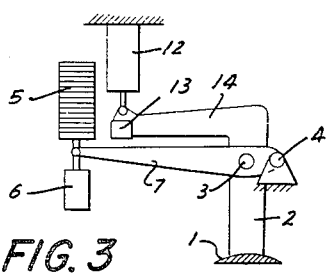
Figure 4:
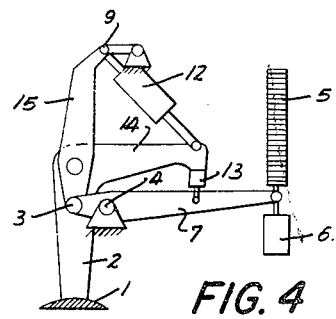
Figure 5:
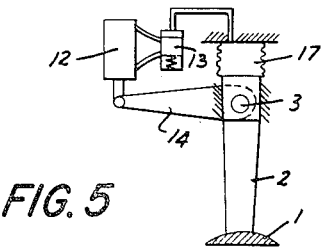
Figure 6:
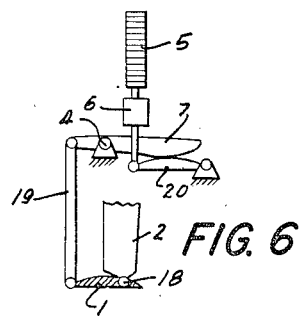
Figure 6A:
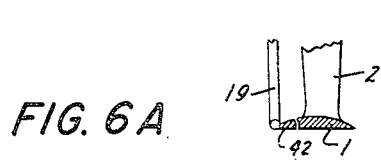
Figure 7:
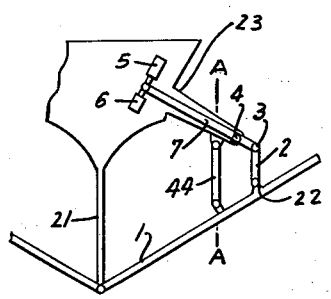
Figure 7A:
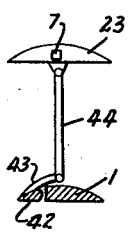
Figure 7B:
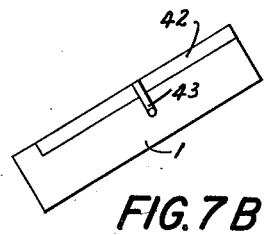
Figure 8:
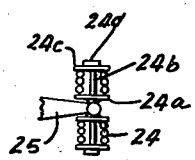
Figure 9:
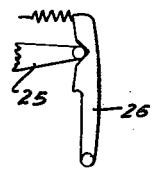
Figure 10:
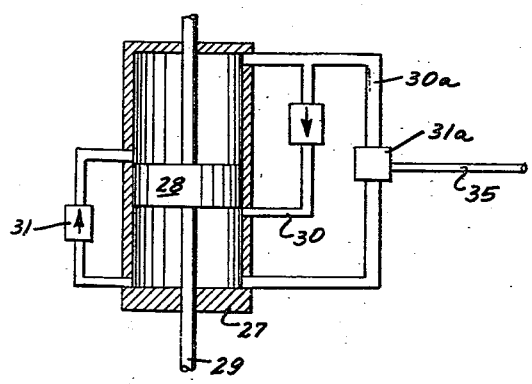
Figure 11:
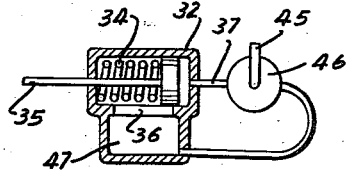

Various forms of my invention are illustrated in the accompanying drawings in which:

Fig. 1 shows a side view of a foil which is vertically movable against the action of a resilient control element, with links as guiding elements, Fig. 2 is a side view of a movable foil with rails as guiding elements, Fig. 3 is a side view of a foil which is vertically movable against an elastic control element and of which the angle of attack is controlled by servomotors, Fig. 4 is a side view of another example of the arrangement of Fig. 3, Fig. 5 shows a side view of a foil of which the angle of attack is controlled through an element responsive to pressure variations by means of servomotors, Fig. 6 is a side view of a pivotable foil in which an elastic control element counteracts the moment about the axis of suspension, Fig. 6a is a fragmentary sectional view of a modified detail, Fig. 7 is a front view and Fig. 7b is a plan view of a hydrofoil pivotable about an axis extending longitudinally of the watercraft, Fig. 7a is a cross sectional view on an enlarged scale taken on line 7a—7a in Fig. 7, Figs. 8 and 9 depict means which exert a holding force on the control gear, Fig. 10 shows a retardation element in section, and Fig. 11 illustrates in section an automatic regulating element for the throttling duct of a retardation element.

In Figs. 1 to 6, the course is from left to right. Like parts and portions in the drawings are designated by like reference numbers.

In Fig. 1, the numeral 1 designates the foil or a portion thereof, and 2 is a supporting means of any suitable shape. The foil set is suspended in an axis 3 on a two-arm lever 7 of which the end 8 is engaged by an elastic means 5 and a retardation element 6. The elastic means 5 may consist of springs, rubber cables or a pneumatic spring cylinder and the like. The lever 7 is pivoted on a pin 4 to the hull. A link 9 which at both its ends is pivotably connected, serves for guiding the hydrofoil means and supporting means 1, 2. The two links 7 and 9 occupy the inclined relative positions shown so that the foil set when rising is inclined so as to decrease its angle of attack and, when being lowered, is inclined so as to increase its angle of attack. The elastic control element 5 counteracts the lifting force via a lever transmission of which the force is chosen of such size that the foil in passage through still water is in the position of the normal angle of attack, but moves upwardly and decreases its angle of attack when the lifting force increases on entering a wave crest, and moves downwardly and increases its angle of attack when the buoyancy decreases on entering a wave trough. The return into the normal position is checked in both directions through the retardation element 6.

An oil pressure servomotor including cylinder and piston means 38 is capable of immediately varying the tension of the element 5 by which the angle of attack and consequently the lifting force is influenced. The cylinder oil supply to one or the other piston side for the purpose of tensioning or relieving the element, is controlled by a control device which responds to inclinations or rotations and which actuates preferably electromagnetic control valves when the craft is inclined.

As shown in Fig. 1, a solenoid operated control valve 39 is switched by an inclination responsive device, such as a gyroscopic horizon 40. When the craft 15 tilts, one of the contacts 41 is closed by element 40 whereby valve 39 is switched to tension element 5 when acting on the sinking foil portions and to release element 5 when acting on the rising foil portions of the craft.

In the example shown in Fig. 2, the foil set is so guided in two rails 10 and 11, which are inclined relatively to each other, that the pivotal movements described occur when the set moves vertically. An elastic control element 5 counteracts the lifting force directly. The retardation element 6 through a rod, shown in dash lines, is connected to the foil set.

In Fig. 3, the foil set is suspended in a similar manner as in Fig. 1. The angle of attack, however is not varied by means of guide elements when the foil moves, but is controlled by a servomotor 12 which is controlled by a pilot device 13. According to one embodiment, the servomotor 12 includes a hydraulic cylinder and a piston, and the pilot device 13 includes a pilot valve which regulates the supply of pressure oil. According to another embodiment, the servomotor 12 is an electric motor and the pilot device 13 is a pilot switch which controls the sense of rotation of the motor. The servomotor 12, which is fixed on the shaft, engages a lever 14 which is connected to the foil-set 1, 2 and to which the pilot device 13 is also secured. The pilot device 13, which controls servomotor 12, is actuated by the link 7 so that the servomotor swings the lever 14 in the same sense in which the lever 7 is moved.

The example of Fig. 4 shows a similar arrangement. The foil set, however, is not mounted directly on the lever 7, but on a body 15 which, when the foil is being moved, through the link 9 is held parallel to itself. To this body also is secured the servomotor 12. Such arrangement provides that resistance variations on the foil set cannot exert any forces on the elastic element 5, but only vertical lifting forces.

In the example shown in Fig. 5, the foil set mounted on the axle pin 3 may move within a small range, for example in a slide 16. The lifting force acts directly onto an element 17 which is responsive to pressure changes and which, for example, may comprise a liquid-filled cylinder with piston or a bellow which through a duct is connected to the control member 13 which preferably is a piston movable in a cylinder governing the direction of pressure-oil flow to the servomotor 12. As long as the element 17 is subjected to normal lifting force and normal pressure, the piston does not move and the servomotor 12 is not actuated. Servomotor 12 is actuated when pressure or suction is exerted in the cylinder due to compression or expansion of the bellows 17, when the normal lifting force is exceeded or not reached so that the foil is rotated in the sense of the invention. In place of the liquid-filled element 17, a resistance body may be provided of which the electrical resistance varies with the pressure for instance a piezometer and which, when the intensity of current varies, actuates a control switch 13 which trips an electric servomotor taking the place of the hydraulic servomotor in one or the other sense of rotation.

In the embodiments described in reference to Figs. 1 to 5 it is for static reasons of great advantage when the movable foils and a rigid member to which these elements are attached form a statically self-contained foil frame work capable of taking up the bending and torsional moments exerted by the lifting forces on the hydrofoil so that these moments need not be transferred onto the guiding elements.

In the example shown in Fig. 6, the hydrofoil means 1 is pivotably suspended on supporting means 2 in an axis 18 situated forwardly of its pressure center and through a rod 19 is connected to the two-arm lever 7 which is fulcrumed at 4 in the craft. The said lever which comprises a lower curved portion is situated on a curved arm 20 which is engaged by the elastic element 5 through the intermediary of the retardation element 6. The two camming levers 7, 20 allow that the lever transmission from the pressure rod 19 onto the element 5 varies in accordance with the pressure-center travel when the angle of attack of foil 1 changes so that the moment variation owing to pressure-center travel is eliminated and the system responds only to variations in the size of the lifting force.

When the lifting force increases, the angle of attack here also is decreased, and vice versa, while the retardation element checks the return into the normal position, as in the other examples. The foil could be arranged rigid and only be provided with controlled flaps or auxiliary foils on its trailing edge as shown in Fig. 6a.

The example of Fig. 7, and Figs. 7a and 7b, shows a foil 1 which is pivotable about the axle 21 which is situated in the longitudinal axis of the craft. The foil is affixed to the double-armed lever 7 through the strut 2 which is secured in the joint 22, the said lever being pivotable in a bearing 4 on a hollow bracket 23. The link 7 again is engaged by the control element 5 and the retardation element 6. The foil according to this embodiment is provided at its trailing edge with a flap 42 which varies the lifting force when angularly displaced so that it is not necessary to vary the angle of the hydrofoil. The lever 43 is secured to the flap 42 and projects forwardly. A rod 44 connects the flap 42 with the fixed bracket 23. When the foil 1 turning about axis 21 is lifted and approaches the fixed bracket 23, the rod 44 effects a decrease of the angle of attack of the flap, whereas the angle of attack of the flap is increased when the hydrofoil moves downwardly.

In the embodiments of the invention shown in Figs. 1 to 4, the control means effect a change in the angular position of the hydrofoil which is proportional to the vertical displacement of the hydrofoil due to the fact that the two movements are directly coupled. In the embodiment of Fig. 5, the variation of the angle of attack of the hydrofoil is proportional to the time period the displacement lasts since element 17 effects a change in the angular position as long as element 17 is not subjected to normal lifting forces. Similarly, in the embodiments of Figs. 3 and 4, the variations of the angle of attack can be a function of the time period the displacement lasts, if the control means 13 is not connected to the lever 14 but fixed on the hull of the craft.

The holding means shown in Fig. 8 may take the place of the element 5 in Figs. 1 to 7. Two springs 24 are provided each of which abuts at one end against the fixed flange 24a of the pin 24b, and at the other end against a disc 24c which is loosely mounted on pin 24b and retained by an abutment 24d of the pin 24b. Between said springs a movable part 25 of the control gear (for instance the lever 7) is situated which, when moved first has to overcome the spring force before the means can adjust itself.

In Fig. 9, an arm 26 which comprises a notch provided with inclined flanks is urged through a spring against a nose or roller of a movable control-gear part (for instance lever 7) so as to produce a holding force.

The retardation element shown in Fig. 10 is a preferred embodiment of the delay element 6 shown in Fig. 6, but may also be applied in the other embodiments of the invention. It comprises a liquid-filled cylinder 27 in which a piston 28 is movable which through a rod 29 is connected to the control mechanism. From the piston center position, on each piston side, a transfer port 30 leads directly to the respective opposite cylinder end. In each port 30 a check valve 31 is disposed which permits the liquid to pass freely in direction of the arrow when the piston moves towards a cylinder end, but which is closed when the piston returns to its center position and thereby forces the liquid to flow through a throttling duct 30a of which the cross-section is regulable by a shut-off element 31a. The shorter the wave length, i. e. the more frequent the movement of the control system in a unit of time, the lesser the retardation through the retardation element, i. e. the larger the aperture radio of the throttling duct.

The automatic regulating element for the throttling duct of the described retardation element comprises, as shown in Fig. 11, a cylinder 32 in which a piston 33 is movable against the action of a spring 34. The piston through a rod 35 is connected to the shut-off element 31a of the throttling duct 30a in Fig. 10. The cylinder has small axial apertures or a narrow slot 36. A lever 45 of a pump 46, such as an oscillating pump or diaphragm pump, is connected to the foil system and the pump supplies liquid when the foil system moves to either side. The liquid is delivered through the duct 37 to the control element and flows back to the oil reservoir 47 through the slot 36. The quantity of liquid supplied is proportional to the frequency and extent of movement of the foil system, and consequently also to the frequency of the waves passed in the unit of time. The piston is moved a distance proportional to the quantity of liquid entering the cylinder in the unit of time. The advancing piston opens the cross section of the throttling duct 30a in Fig. 10 at an increasing rate.

In the case of craft comprising tandem foils, it will be of advantage in many cases when the spring constants of the resilient control element and the rate of retardation of the return movement into the normal position is chosen of different size on the fore and aft foils.

What I claim is:

1. A hydrofoil arrangement for watercraft having a hull comprising, in combination, a double armed supporting lever mounted on said watercraft for turning movement about a horizontal axis; a supporting means turnably mounted on one arm of said supporting lever and being movable in vertical direction with the same; a hydrofoil means supported on said supporting means downwardly spaced from the hull, said supporting means and said hydrofoil means being movable between a normal position and a plurality of displaced positions; a control link member turnably mountable at one end thereof on said watercraft and pivotally connected at the other end thereof to said supporting means at a point spaced from said arm of said supporting lever, said control link member and said arm of said supporting lever being inclined with respect to each other so that said control lever member turns said hydrofoil means into an angularly displaced position in which the angle of attack of the same is changed in such sense as to compensate the change of lifting forces acting on the hydrofoil means during passage through a wave when said hydrofoil means is moved by a wave out of said normal position into a displaced position.

2. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; and a control device operatively connected to said supporting means to cause said hydrofoil means to turn out of a normal position into an angularly displaced position when said hydrofoil means and said supporting means are vertically displaced.

3. Hydrofoil control arrangement for a watercraft having a hull, comprising, in combination, hydrofoil means; supporting means supporting said hydrofoil means downwardly spaced from the hull; guiding elements for supporting said supporting means on the hull for vertical and turning movement together with said hydrofoil means; elastic means connected to said supporting means for balancing the hydrodynamic lifting force of said hydrofoil means in such manner that said hydrofoil means and said supporting means are vertically displaced by a change of lifting force in waves; and a control device operatively connected to said supporting means to cause the same and said hydrofoil means to turn out of a normal position into an angularly displaced position when said hydrofoil means and said supporting means are vertically displaced.

4. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; and a control device for operatively connecting the hull and said hydrofoil means to cause said hydrofoil means to turn out of a normal position into an angularly displaced position when said hydrofoil means and said supporting means are vertically displaced.

5. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; a control device operatively connected to said supporting means to cause said hydrofoil means to turn out of a normal position into an angularly displaced position when said hydrofoil means and said supporting means are vertically displaced; and a retardation element connected to said supporting means and retarding movement of the same and of said hydrofoil means.

6. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; a control device operatively connected to said supporting means to cause said hydrofoil means to turn out of a normal position into an angularly displaced position when said hydrofoil means and said supporting means are vertically displaced; and a retardation element including a liquid filled cylinder, a piston connected to said supporting means and defining two chambers in said cylinder, and conduit means and valve means connecting said chambers and allowing the liquid to pass freely from one chamber to the other chamber when said piston moves from its center position toward a cylinder end, such retardation being effective only during movement of said hydrofoil means from a displaced position to a normal position.

7. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; a control device operatively connected to said supporting means to cause said hydrofoil means to turn out of a normal position into an angularly displaced position when said hydrofoil means and said supporting means are vertically displaced; and a retardation element connected to said supporting means and retarding the movement of said hydrofoil means from a displaced position to the normal position.

8. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; a control device operatively connected to said supporting means to cause said hydrofoil means to turn out of a normal position into an angularly displaced position when said hydrofoil means and said supporting means are vertically displaced; and spring means engaging said supporting means in said normal position of said hydrofoil means and exerting on the same a force tending to hold said hydrofoil means in said normal position.

9. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; and a control device operatively connected to said supporting means to cause said hydrofoil means to turn out of a normal position into an angularly displaced position when said hydrofoil means and said supporting means are vertically displaced, said control device operating said hydrofoil means to decrease the angle of attack of said hydrofoil means when the same and said supporting means move upwardly and to increase the angle of attack when the same and said supporting means move downwardly.

10. Hydrofoil control arrangement for a watercraft having a hull, comprising, in combination, hydrofoil means; supporting means supporting said hydrofoil means downwardly spaced from the hull; a pair of projecting guiding members fixedly secured to said supporting means; and a pair of fixed guiding means formed with a pair of spaced guiding slots being inclined to each other and engaging said projecting guiding members for supporting said supporting means on the hull for vertical and turning movement together with said hydrofoil means whereby said hydrofoil means turn out of a normal position into an angularly displaced position when said hydrofoil means and said supporting means are vertically displaced.

11. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; and a control device including a servomotor means connected to said supporting means for turning said hydrofoil means, and a pilot device for controlling said servomotor means, said pilot device being connected to said supporting means and being actuated by the same to actuate said servomotor means when said supporting means is vertically displaced whereby said hydrofoil means turns out of a normal position and into an angularly displaced position when said hydrofoil means and said supporting means are vertically displaced.

12. A hydrofoil control arrangement as set forth in claim 11 wherein said control device includes pressure responsive means connecting said supporting means and said pilot device for actuating said pilot device for controlling said servomotor means, said servomotor means being actuated by said pilot device when the lifting force on said hydrofoil means and thereby the pressure exerted on said pressure responsive means changes.

13. A hydrofoil control arrangement as set forth in claim 12 wherein said pressure responsive means is a compressible hollow means adapted to contain an operating fluid; and wherein said pilot device includes a cylinder and a piston controlling the direction of flow of the operating fluid to said servomotor means; and conduit means connecting said compressible hollow means with said cylinder of said pilot device.

14. Hydrofoil control arrangement for a watercraft having a hull, comprising, in combination, hydrofoil means; supporting means supporting said hydrofoil means downwardly spaced from the hull for turning movement about an axis located forwardly of the center of pressure of the hydrofoil means; guiding elements for supporting said supporting means on the hull for vertical movement together with said hydrofoil means; another supporting means connected to the rearward portion of said hydrofoil means; elastic means connected to said other supporting means for balancing the hydrodynamic lifting force of said hydrofoil means in such manner that said hydrofoil means and said supporting means are vertically displaced by a change of lifting force in waves; and a control device operatively connected to said other supporting means to cause said hydrofoil means to turn out of a normal position into an angularly displaced position when said hydrofoil means and said other supporting means are vertically displaced.

15. A hydrofoil control arrangement as claimed in claim 14 wherein said control device connects said other supporting means with said elastic means and includes a double armed lever having one arm connected to said other supporting means, and the other arm provided with a cam face; a lever pivotally mounted at one end thereof on the watercraft and having the other end connected to said elastic means, said lever having a cam face engaging said first mentioned cam face of said double armed lever whereby the effective lever arm through which said elastic means acts on said double armed lever and on said hydrofoil means is varied in accordance with the travel of the center of pressure on the hydrofoil profile.

16. A hydrofoil control arrangement as set forth in claim 8 wherein said hydrofoil means extends transverse with respect to the hull and is supported at one end thereof by said supporting means for vertical movement; means on the hull supporting the other end of said hydrofoil means for turning movement about a longitudinal axis; and a flap portion turnably mounted on the aft part of said hydrofoil means for turning movement about a transverse axis; and wherein said control means include a lever secured to said flap portion projecting forwardly and adapted to be connected to a fixed point of the watercraft.

17. A hydrofoil control arrangement as set forth in claim 6 wherein said conduit means include two conduits respectively connecting points near the center of said cylinder in each of said chambers with points near the end of said cylinder in the respective other of said chambers; throttling duct means connecting said chambers and opening into said cylinder near the ends of the same; and adjustable throttling means in said throttling duct means.

18. A hydrofoil control arrangement as claimed in claim 17 wherein said throttling means include a throttling cylinder, a throttling piston in said cylinder and formed with perforations parallel to the cylinder axis, a spring urging said piston in one direction; and including pump means connected to the hydrofoil means so as to be actuated upon movement of the same and supplying fluid to said throttling cylinder whereby said throttling means opens the cross-section of said throttling duct when said throttling piston advances against the action of said spring.

19. Hydrofoil control arrangement for a watercraft having a hull, comprising, in combination, hydrofoil means; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; and a control device operatively connected to said supporting means to cause said hydrofoil means to turn out of a normal position into an angularly displaced position when said hydrofoil means and said supporting means are vertically displaced, said control device including a servomotor means for varying the resilient force of said elastic means, and a device controlling said servomotor and being responsive to inclinations of the watercraft in such sense that the elastic means are tensioned when acting on sinking hydrofoil portions and are relieved when acting on rising hydrofoil portions.

20. Hydrofoil control arrangement for a watercraft having a hull, comprising, in combination, hydrofoil means including a flap mounted on the trailing edge thereof for turning movement; supporting means supporting said hydrofoil means downwardly spaced from the hull for turning movement; guiding elements for supporting said supporting means on the hull for vertical movement together with said hydrofoil means; elastic means connected to said supporting means for balancing the hydrodynamic lifting force of said hydrofoil means in such manner that said hydrofoil means and said supporting means are vertically displaced by a change of lifting force in waves; a control device operatively connected to said supporting means and to the rearward portion of said flap to cause said flap to turn out of a normal position into an angularly displaced position when said hydrofoil means and said supporting means are vertically displaced; and a retardation element including a liquid filled cylinder, a piston connected to said supporting means and defining two chambers in said cylinder, and conduit means and valve means connecting said chambers and allowing the liquid to pass freely from one chamber to the other chamber when said piston moves from its center position toward a cylinder end, such retardation being effective only during movement of said hydrofoil means from a displaced position to a normal position.

References Cited in the file of this patent

UNITED STATES PATENTS

| | | |
|---|---|---|
| 955,343 | Meacham | Apr. 19, 1910 |
| 1,112,405 | Forlanini | Sept. 29, 1914 |
| 1,186,816 | Meacham | June 13, 1916 |
| 2,073,438 | Adams | Mar. 9, 1937 |
| 2,257,406 | Von Burtenbach | Sept. 30, 1941 |
| 2,491,744 | Link | Dec. 20, 1949 |
| 2,576,716 | Gardiner | Nov. 27, 1951 |

FOREIGN PATENTS

| | | |
|---|---|---|
| 251,789 | Italy | Feb. 2, 1927 |
| 414,032 | France | June 9, 1910 |